United States Patent
Soliman et al.

(10) Patent No.: US 7,282,012 B2
(45) Date of Patent: Oct. 16, 2007

(54) ELECTRONIC ADAPTIVE SWAP-SHIFT CONTROL FOR AN AUTOMATIC TRANSMISSION FOR AUTOMOTIVE VEHICLES

(75) Inventors: Ihab Soliman, Dearborn, MI (US); Brian Keyse, Farmington Hills, MI (US); Steve Cicala, Dearborn Heights, MI (US); Ken Sovel, Lake Havasu City, AZ (US); Charles Suter, South Lyon, MI (US); Bradley Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/462,210

(22) Filed: Aug. 3, 2006

(65) Prior Publication Data

US 2006/0287158 A1   Dec. 21, 2006

Related U.S. Application Data (62) Division of application No. 10/712,683, filed on Nov. 13, 2003, now Pat. No. 7,115,069.

(51) Int. Cl.
*F16H 61/04* (2006.01)
*F16H 61/26* (2006.01)
*G06F 7/00* (2006.01)

(52) U.S. Cl. .................. 477/143; 477/127; 701/58
(58) Field of Classification Search .............. 477/143, 477/153, 155, 127, 130; 701/58, 59, 60, 701/66
See application file for complete search history.

(56) References Cited

U.S. PATENT DOCUMENTS

| | | | |
|---|---|---|---|
| 5,072,390 A * | 12/1991 | Lentz et al. ............. | 477/155 |
| 5,122,103 A | 6/1992 | Nakawaki et al. | |
| 5,553,694 A | 9/1996 | Schulz et al. | |
| 5,722,519 A | 3/1998 | Kirchhoffer | |
| 5,733,220 A | 3/1998 | Iizuka | |
| 5,758,302 A | 5/1998 | Schulz et al. | |
| 5,911,647 A | 6/1999 | Kozaki et al. | |
| 5,925,086 A | 7/1999 | Sakai et al. | |
| 6,292,731 B1 | 9/2001 | Kirchhoffer | |
| 6,370,463 B1 | 4/2002 | Fujii et al. | |
| 6,569,060 B2 | 5/2003 | Rosi et al. | |
| 6,577,939 B1 | 6/2003 | Keyse et al. | |
| 6,726,589 B2 | 4/2004 | Horiguchi | |
| 6,872,166 B2 | 3/2005 | Takagi et al | |
| 6,994,647 B2 * | 2/2006 | Cicala et al. ............. | 475/127 |
| 7,216,025 B2 * | 5/2007 | Keyse et al. ............. | 701/58 |
| 2002/0028728 A1 | 3/2002 | Yuasa et al. | |
| 2002/0156563 A1 | 10/2002 | Sato et al. | |

FOREIGN PATENT DOCUMENTS

JP   406235451 A   8/1994

\* cited by examiner

*Primary Examiner*—Roger Pang
(74) *Attorney, Agent, or Firm*—David B. Kelly; Brooks Kushman P.C.

(57) ABSTRACT

A control system and control method for a swap-shift transmission having auxiliary and main gearsets wherein precise synchronization control of ratio changes of each gearset at the start and at the end of a swap-upshift progression is achieved using an adaptive control to adjust friction element pressure values and slip times for friction elements of each gearset, whereby shift synchronization is achieved throughout the operating life of the transmission.

10 Claims, 8 Drawing Sheets

Simpson Gearset Swap-Upshift Adaptive Priority Learning Scheme – Secondary Conditions Detected

|  | ① Ratio Change During Boost | ② Aggressive Ramp Reached | ③ Torque Transfer Time Error | ④ Overall Slip Time Error | ⑤ Initial Slip Time Error |
|---|---|---|---|---|---|
| ① Ratio Change During Boost | Adapt Ⓐ for: ① | Adapt Ⓐ for: ① | Adapt Ⓐ for: ① | Adapt Ⓐ for: ① | Adapt Ⓐ for: ① |
| ② Aggressive Ramp Reached | Adapt Ⓐ for: ① | Adapt Ⓑ for: ② | Adapt Ⓑ for: ② | Adapt Ⓑ for: ② | Adapt Ⓑ for: ② |
| ③ Torque Transfer Time Error | Adapt Ⓐ for: ① | Adapt Ⓑ for: ② | Adapt Ⓐ for: ③ | If ITT error large, adapt Ⓐ for ③ else adapt Ⓐ for ③ & adapt Ⓑ for ④ | If ITT error large, adapt Ⓐ for ③ else adapt Ⓐ for ③ & adapt Ⓑ for ⑤ |
| ④ Overall Slip Time Error | Adapt Ⓐ for: ① | Adapt Ⓑ for: ② | If ITT error large, adapt Ⓐ for ③ else adapt Ⓐ for ③ & adapt Ⓑ for ④ | Adapt Ⓑ for: ④ | Adapt Ⓑ for: ④ |
| ⑤ Initial Slip Time Error | Adapt Ⓐ for: ① | Adapt Ⓑ for: ② | If ITT error large, adapt Ⓐ for ③ else adapt Ⓐ for ③ & adapt Ⓑ for ⑤ | Adapt Ⓑ for: ④ | Adapt Ⓑ for: ⑤ |

*Primary Conditions Detected*

ELECTRONIC ADAPTIVE SWAP-SHIFT CONTROL FOR AN AUTOMATIC TRANSMISSION FOR AUTOMOTIVE VEHICLES

CROSS-REFERENCE TO RELATED APPLICATIONS

This application is a division of U.S. application Ser. No. 10/712,683, filed Nov. 13, 2003, now U.S. Pat. No. 7,115, 069. It discloses a control system for a swap-shift transmission of the kind disclosed in co-pending U.S. patent application Ser. No. 10/699,383, entitled "Automatic Transmission Control System With Direct Electronic Swap-Shift Control," filed by Ihab S. Soliman, Brian Keyse and Brad Riedle on Oct. 31, 2003, which is assigned to the assignee of the present invention.

BACKGROUND OF THE INVENTION

1. Field of the Invention

The invention relates to an automatic transmission for automotive vehicles having multiple-ratios wherein ratio changes between at least one pair of ratios is a swap-shift.

2. Background Art

Swap-shift transmissions for automotive vehicle powertrains are disclosed in prior art U.S. Pat. Nos. 6,292,731; 5,722,519; 5,553,694; 5,758,302; 6,370,463; and 6,577,939. Each of these patents discloses a control system for a multiple-ratio automatic transmission for automotive vehicle powertrains. The transmission includes first and second gearsets arranged in series so that the torque output element of the first gearset delivers torque to the torque input element of the second gearset. The first gearset is an overdrive gearset or an auxiliary gearset. The second gearset is a multiple-ratio gearset, which is referred to as the main gearset. In the case of the prior art patents identified above, the multiple-ratio gearset is a so-called Simpson gearset, which comprises a first planetary gear unit and a second planetary gear unit with a common sun gear.

The torque input element of the first gearset is connected to the turbine of a hydrokinetic torque converter driven by an engine in the powertrain. The torque output element of the second gearset is connected to vehicle traction wheels through a differential-and-axle assembly in known fashion.

During acceleration of the vehicle, as the engine delivers power to the traction wheels, the overall transmission ratio can progress from an initial high torque multiplication ratio to a low torque multiplication ratio with ratio steps between the high ratio and the low ratio.

The transmission is characterized by a so-called swap-shift during upshifts from a second overall forward driving gear ratio to a third overall forward driving gear ratio and from the second overall forward driving gear ratio to a fifth overall forward driving gear ratio. Conversely, a swap-shift occurs during downshifts from the third overall gear ratio to the second overall gear ratio and from the fifth overall gear ratio to the second overall gear ratio.

During a swap-upshift from the second overall gear ratio to the third overall gear ratio, the overdrive gearset must be downshifted while the Simpson gearset is upshifted, the shifts in the gearsets being synchronized or coordinated during the overall shift progression. Conversely, a swap-downshift from the third overall gear ratio to the second overall gear ratio requires a simultaneous upshift of the overdrive gearset and a downshift of the Simpson gearset in a synchronized fashion.

Ratio changes are controlled by a pressure operated friction clutch or brake for each gearset. In the case of a 2-3 swap-upshift from the second overall gear ratio to the third overall gear ratio, a reaction brake on the overdrive gearset must be released as a reaction brake for the Simpson gearset is applied. Conversely, on a 3-2 swap-downshift, a reaction brake for the Simpson gearset must be released in synchronism with the application of a friction brake for the overdrive gearset.

A swap-upshift from the second overall gear ratio to the fifth overall gear ratio requires release of a reaction brake for the overdrive gearset in synchronism with engagement of a friction clutch for the Simpson gearset. The friction clutch for the Simpson gearset drivably connects together two gear elements of the Simpson gearset so that the Simpson gearset gear ratio, following the upshift, is unity.

In the transmission of the present disclosure, the overdrive gearset is a simple planetary gear unit with two gear ratios: a low ratio, which is unity, and a high ratio, which is an overdrive. The Simpson gearset is characterized by three forward drive gear ratios (as well as a reverse ratio). The first forward drive gear ratio has high torque multiplication, and the third forward drive gear ratio is unity. The second gear ratio is approximately midway in the torque ratio progression from the highest torque multiplication ratio to the lowest torque multiplication ratio.

The overdrive gearset, in combination with the three Simpson gearset gear ratios, is capable of producing an overall ratio range of six gear ratios, since each of the three Simpson gearset gear ratios can be combined with each of the two overdrive gearset gear ratios.

Precise synchronization is required to achieve acceptable shift quality during swap-upshifts and swap-downshifts. This synchronization should be maintained throughout the life of the transmission, notwithstanding the presence of wear of the torque transfer friction elements and changes in environmental conditions, such as temperature, lubricant viscosity changes and changes in coefficients of friction for the clutches and brakes.

Even small errors in synchronization of the gear ratio changes for the overdrive gearset and the Simpson gearset, as the two gearsets are upshifted and downshifted during a swap-shift, will have a significant adverse effect on the overall shift quality. One of these adverse effects is referred to as a ratio "flare" condition. Another is referred to as a ratio "overshoot" condition. These conditions, as well as other error conditions, can cause significant, perceptible torque disturbances at the torque output shaft for the transmission.

A ratio "flare" occurs when the overdrive gearset begins its gear ratio progression during a swap-shift before the Simpson gearset begins its gear ratio progression. A ratio "overshoot" occurs if the Simpson gearset shift progression ends before slipping of the friction element for the overdrive gearset is completed.

SUMMARY OF THE INVENTION

The control system of the present invention will eliminate errors in synchronization of the upshift and the downshift of the two gearsets by providing an adaptive pressure control. The two gearsets may be referred to as auxiliary and main gearsets, or first and second gearsets. The second gearset sometimes is referred to as a Simpson gearset.

The adaptive pressure control will adapt the transmission to current vehicle component and environmental conditions. It "learns" pressure control adjustments for the friction elements involved in a swap-shift, such that precise, consistent upshift and downshift synchronization can be achieved under all operating conditions.

The adaptive control of the present invention uses a closed-loop controller for the overdrive gearset and integrates the controller effort as one of the conditions for adapting the offgoing friction element slip pressure at the overdrive gearset.

Another feature of the present invention is its ability to adapt the overdrive gearset to correct for ratio flares, to which reference was made in the preceding discussion. It does this by adapting the offgoing starting pressure for the overdrive clutch, provided there is no aggressive "ramping" and no ratio changing during an initial boost in Simpson gearset friction element pressure at the outset of the shift. Further, if the Simpson gearset is significantly adapting for any changes in the operating conditions, any detected flares would be ignored and the overdrive gearset "learning" would be disabled until there is only minimal "learning" for the Simpson gearset. In this respect, the Simpson gearset is treated as a so-called master and the overdrive gearset is treated as a so-called slave in a master-slave relationship. This master-slave relationship is described also in the invention of the co-pending patent application referred to previously.

The invention accomplishes gear ratio overshoot "learning" as long as the pressure being applied to the Simpson gearset friction element is not being increased aggressively, and as long as a gear ratio change in the Simpson gearset is not occurring during pressure boost of the friction element for the Simpson gearset. The offgoing friction element slip pressure can be adapted for the overdrive gearset to correct for a ratio overshoot.

The control system of the present invention makes it possible to achieve simultaneous "learning" by the overdrive gearset for both ratio flare and ratio overshoot. The control system can support almost all levels of simultaneous "learning," as long as the adaptation for the Simpson gearset is minimal. The control system cannot simultaneously adapt for both ratio overshoot and for error in synchronization of the overdrive gearset relative to the end of a gear ratio change in the Simpson gearset. If that is the case, ratio overshoot correction will take higher priority over a correction for synchronization error.

Another feature of the invention makes it possible to follow a priority schedule for correcting errors in those conditions that affect swap-shift quality. If multiple errors are detected simultaneously, for example, ratio overshoot takes higher priority over end-of-shift synchronization errors, and ratio flare takes priority over other error conditions, such as an error in overall slip time for the friction elements.

The adaptive control scheme, which is based on a learning priority schedule, maintains the previously-mentioned master-slave relationship between the Simpson gearset and the overdrive gearset friction elements. The adaptive pressure control system of the invention will first adapt the Simpson gearset friction element by learning any vehicle component or environmental variation. Once learning for the Simpson gearset friction element becomes minimal, adaptation then takes place on the overdrive friction element.

There are various levels of simultaneous learning for the overdrive gearset and the Simpson gearset. The level of learning depends upon the calibration of the control system. The overall main objective of a swap-shift adaptive pressure control is to meet the shift synchronization requirements for simultaneous upshift and downshift of the two gearsets throughout the life of the transmission.

DETAILED DESCRIPTION OF AN EMBODIMENT OF THE INVENTION

Figure 1A:
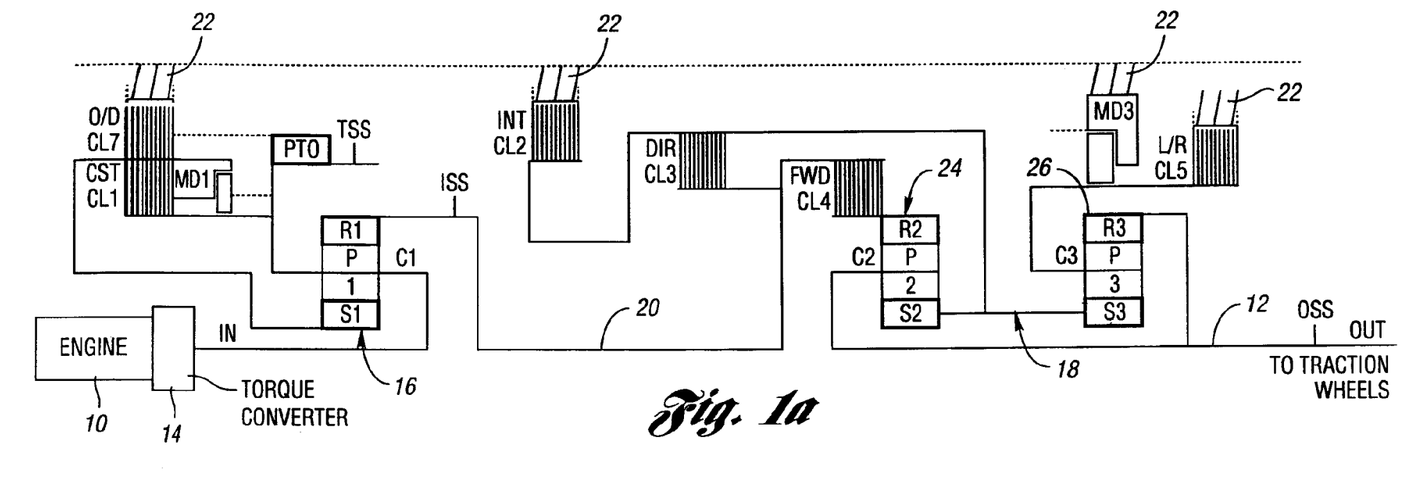
FIG. 1a is a schematic diagram of a multiple-ratio transmission capable of embodying the control system of the invention.

The embodiment of the present invention has features that are disclosed in the related co-pending patent application previously identified. In FIG. 1a, the engine for the powertrain is shown at 10 and the torque output shaft is shown at 12, the latter being connected to the traction wheels through a differential and axle assembly in the usual manner. Engine torque is delivered to and multiplied by a hydrokinetic torque converter 14, the torque converter turbine being connected to carrier C1 of a simple planetary overdrive gearset 16. A turbine speed sensor TSS measures turbine speed, which is the same as speed of carrier C1.

A compound Simpson planetary gearset is shown at 18. An intermediate shaft 20 connects the output ring gear R1 of the overdrive gearset 16 to the torque input side of forward clutch CL4 for the Simpson gearset 18. Intermediate shaft speed sensor ISS measures speed of the intermediate shaft 20 and ring gear R1.

The sun gear S1 for the overdrive gearset 16 can be braked to the transmission housing 22 by overdrive brake or clutch CL7. A coast clutch CL1 selectively connects sun gear S1 to the planetary carrier C1 of the overdrive gearset 16 when torque distribution through the transmission is reversed, such as during coast braking.

The sun gear S1 acts as a reaction point when the overdrive gearset 16 is in an overdrive mode. With the brake CL7 released, overrunning coupling MD1 drivably connects a planetary carrier C1 to the sun gear S1, which establishes a gear ratio of unity in the planetary gearset 16.

The Simpson gearset 18 has compound gearing including sun gear, shown in FIG. 1a as S2 and S3. Sun gears 52 and 53 can be a common sun gear or they can be connected by a sun gear shaft as shown. Simpson gearset 18 comprises also second planetary gear unit 24 and third planetary gear unit 26. Torque output shaft 12 is connected to carrier C2 for the planetary gear unit 24. Ring gear R2 is connected to the intermediate shaft 20 through the forward clutch CL4 during forward drive operation.

When the Simpson gearset is in its lowest gear ratio, torque is distributed to the sun gear S3 of the third planetary gear unit, which drives the ring gear R3 in a forward driving direction as the carrier C3 is braked by the low and reverse brake CL5. Alternatively, the carrier C3 can be braked by the overrunning coupling MD3 to provide torque reaction for the carrier C3 during operation in the low overall gear ratio. Torque delivered to ring gear R2 through intermediate shaft 20 and forward clutch CL4 causes carrier torque from carrier C2 to be delivered to output shaft 12 to augment torque delivered to output shaft 12 from ring gear R3.

To upshift the transmission from the lowest overall gear ratio to the next higher overall gear ratio, the clutch CL2 is applied, thereby braking sun gear S2 of the second planetary gear unit 24. Carrier C2 and torque output shaft 12 then are driven at an increased speed relative to the speed of the carrier C1.

To upshift the transmission from the second overall gear ratio to the third overall gear ratio, the Simpson gearset ratio is upshifted, but the overdrive gearset ratio is downshifted by releasing brake CL7 so that the overrunning coupling MD1 will lock together the carrier C1 and the sun gear S1.

A shift of the transmission from the third overall gear ratio to the fourth overall gear ratio is achieved by upshifting the overdrive gearset 16. This is done by applying brake CL7, which anchors sun gear S1. This overdrives ring gear R1, and overrunning coupling MD1 begins to overrun.

A shift of the transmission from the fourth overall gear ratio to the fifth overall gear ratio is achieved by engaging direct clutch CL3 and releasing clutch CL2, which, together with forward clutch CL4, locks together sun gear S2 and ring gear R2 so that overrunning coupling MD3 overruns and the ratio in the Simpson gearset is unity.

A shift of the transmission from the fifth overall gear ratio to the sixth overall gear ratio can be achieved by merely braking the sun gear S1, as in the case of operation of the second and fourth ratios, to overdrive the gearset 16 as the ratio of the Simpson gearset remains at unity.

The output shaft speed sensor OSS in FIG. 1a measures the speed of ring gear R3 and output shaft 12. This speed sensor complements the other two speed sensors, TSS and ISS, to provide speed information to the control system, which is speed-based.

Figure 1B:
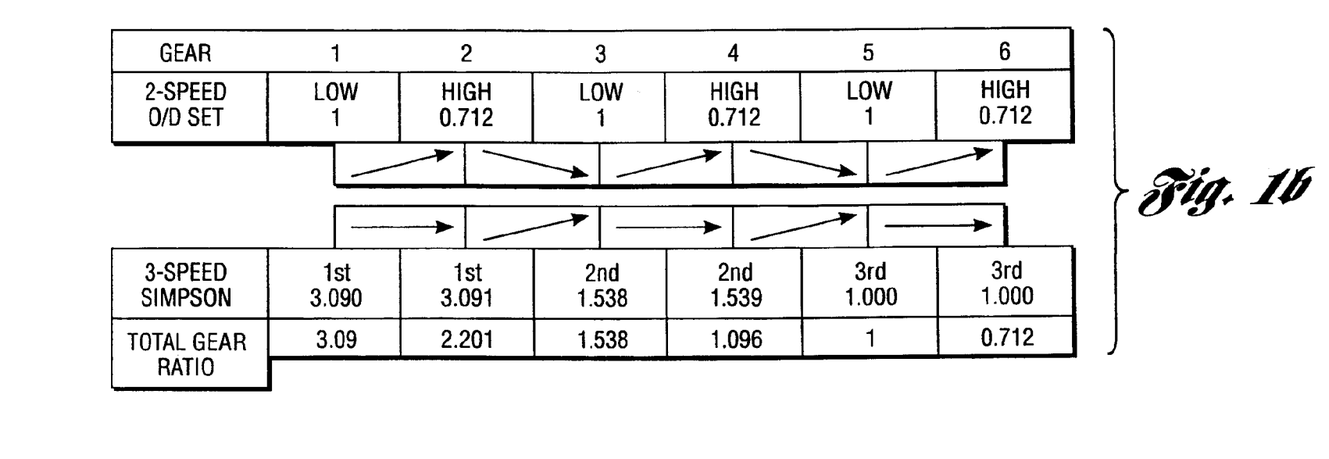
FIG. 1b is a chart showing ratio progression throughout the overall ratio range for the transmission of FIG. 1 wherein the individual ratios of the overdrive gearset and the Simpson gearset during an overall ratio progression are identified.

The arrows in the diagram of FIG. 1b indicate the ratio change direction for the gearsets 16 and 18 during ratio change progression.

Figure 2:
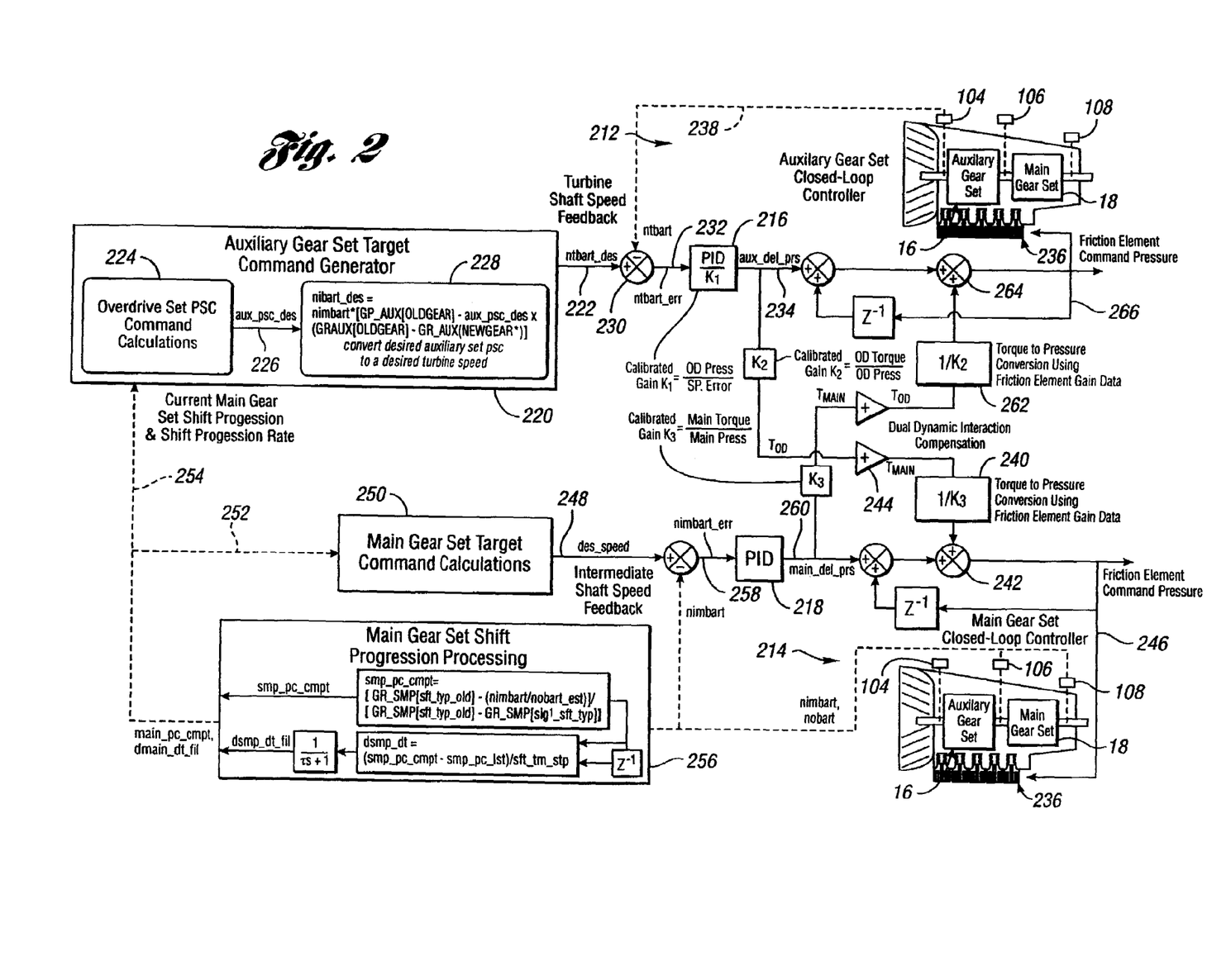
FIG. 2 is a schematic diagram of the overall control system for the overdrive gearset and the Simpson gearset, which includes dual dynamic interaction compensation for varying operating conditions for the controllers for each gearset.

The closed-loop coordinated control for the overdrive (auxiliary) gearset and the Simpson (main) gearset is illustrated in schematic form in FIG. 2. The overdrive (auxiliary) gearset closed-loop control system is shown in FIG. 2 at 212 and the Simpson (main) gearset closed-loop control system is shown at 214. Each gearset has its own closed-loop controller. The closed-loop controller for the overdrive gearset is shown at 216 and the closed-loop controller for the Simpson gearset is shown at 218.

An auxiliary gearset target command generator 220 monitors the progression of the shift in the Simpson gearset. It computes a shift progression for the overdrive gearset controller. It calculates a desired turbine speed, shown at 222, using desired overdrive gearset percentage shift complete command calculations, shown at 224. The output of the calculations at 224 is a desired percent shift complete value at 226. That value is converted to a desired turbine speed, as shown at 228. The conversion of speed error at 232 to pressure at 234 is computed at 216 using a gain factor $K_1$, which is a calibrated value equal to overdrive friction element pressure divided by turbine speed error.

The actual turbine speed is measured by sensor 104 (TSS in FIG. 1a) and is compared at comparator 230 to the desired turbine speed 222. Any error in these speed values is seen at 232 and is distributed to the closed-loop controller 216. The output of the closed-loop controller 216 is a pressure value at 234, which is distributed to the solenoid-operated pressure control valves at 236 for the overdrive gearset. The turbine speed feedback control loop is shown at 238. Calibrated gain data $K_2$ is used to convert pressure to torque for the overdrive (auxiliary) gearset, where $K_2$=overdrive torque/overdrive pressure. Calibrated gain $K_3$ is used to convert pressure to torque for the Simpson (main) gearset, where $K_3$=Simpson gearset friction element torque/Simpson pressure.

The computed overdrive gearset pressure at the output side of the closed-loop controller 216 is converted to overdrive gearset friction element torque using K2. It then is converted to Simpson gearset friction element torque using swap-crosslink gain 244 to account for dynamic interaction between the two gearsets. Simpson element torque is converted to Simpson element pressure 240 by dividing by gain $K_3$. The output of the torque-to-pressure conversion is distributed to summing point 242, which, in turn, is distributed as shown at 246 to the solenoid-operated pressure control valves for the main gearset at 236. This feature is part of the dual dynamic interaction compensation for disturbances in the desired pressure build-up or pressure decrease in the overdrive gearset, which will have an effect on the pressure build-up or the pressure decrease for the Simpson gearset.

The closed-loop control system 214 for the Simpson gearset includes a control unit for determining desired intermediate shaft speed at 248. The desired speed at 248 is determined at 250 where the Simpson gearset target command calculations occur. This is done using a shift progression rate calibration using test data to determine a desired rate. That value is integrated with respect to time to produce a desired shift progression value, which is then converted to a desired intermediate shaft speed.

The Simpson gearset shift progression and shift progression rate are monitored at 256 using outputs from the speed sensors 106 (ISS in FIG. 1a) and 108 (OSS in FIG. 1a). The Simpson gearset shift progression monitored at 256 affects the Simpson gearset target command calculations at 250 as well as the overdrive gearset target command calculations at 220.

The desired intermediate shaft speed at 248 is compared to the intermediate speed monitored by the speed sensor 106. The intermediate shaft speed error at 258 is distributed to controller 218. Conversion from an error to pressure at 218 is accomplished using gain data in a fashion similar to the conversion explained previously with respect to controller 216. The output of the controller 218 is a pressure at 260, which is converted to a Simpson (main) torque using gain $K_3$, and then converted to an overdrive gearset friction element torque using a swap-crosslink gain to account for dynamic interaction between the two gearsets. Overdrive gearset torque is converted to overdrive gearset element pressure at 262 by dividing by gain $K_2$.

The pressure at 262 is distributed to summing point 264, thus modifying the pressure distributed to the overdrive gearset friction element, as shown at 266.

The symbol $Z^{-1}$ at function block 256 represents the last Simpson gearset shift progression from the last control loop.

The symbol $Z^{-1}$ at the Simpson gearset controller 214 and at the overdrive gearset controller 212 represent feedback information from the last control loop as the controllers 214 and 212 compute their respective friction element command pressures. That feedback information is combined with the outputs of controllers 216 and 218 to update the friction element command pressures for the overdrive gearset friction element and the Simpson gearset friction element, respectively. The command pressures are computed for each control loop of the system.

Figure 4A:
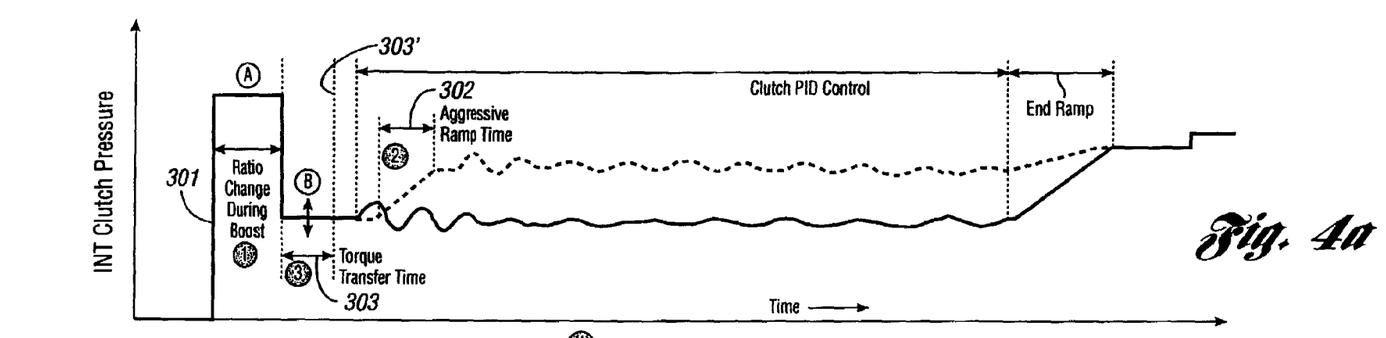
FIG. 4a is a time plot of the Simpson friction element pressure involved in a swap-upshift in accordance with the adaptive pressure control of the present invention.

In practicing the control strategy of the present invention, the oncoming friction element pressure boost time adjustment is used as one of four major adaptive parameters. This is indicated in the plot of FIG. 4a by the symbol A. Another of the major adaptive parameters used by the control system is the oncoming friction element starting pressure adjustment for the Simpson gearset. This is illustrated by the symbol B in FIG. 4a. The third major adaptive parameter used by the control system is the offgoing friction element starting pressure adjustment for the overdrive gearset before a ratio change occurs (i.e., zero slip) at 444. This is indicated in the plot of FIG. 4d by the symbol C. A fourth major adaptive parameter used by the control system is the offgoing friction element slip pressure adjustment D after a ratio change at the overdrive gearset.

The four major adaptive parameters are adjusted based on the measured conditions (or errors) during the progression of a swap-upshift. There are nine such measured conditions, sometimes referred to as metrics. These metrics are measured for adaptation purposes.

The nine measured conditions are identified in FIGS. 4a, 4b, 4c, 4d and 4f. A ratio change "1" for the Simpson gearset during the boost is shown at 301. The time into the aggressive ramp "2" for the Simpson gearset, which is the second measured condition, is indicated in FIG. 4a at 302. The actual torque transfer time "3" during a swap-upshift is shown in FIG. 4a at 303. The torque transfer time starts at the end of boost and ends at 303' in FIG. 4a when Simpson gearset ratio change is detected.

Figure 4B:
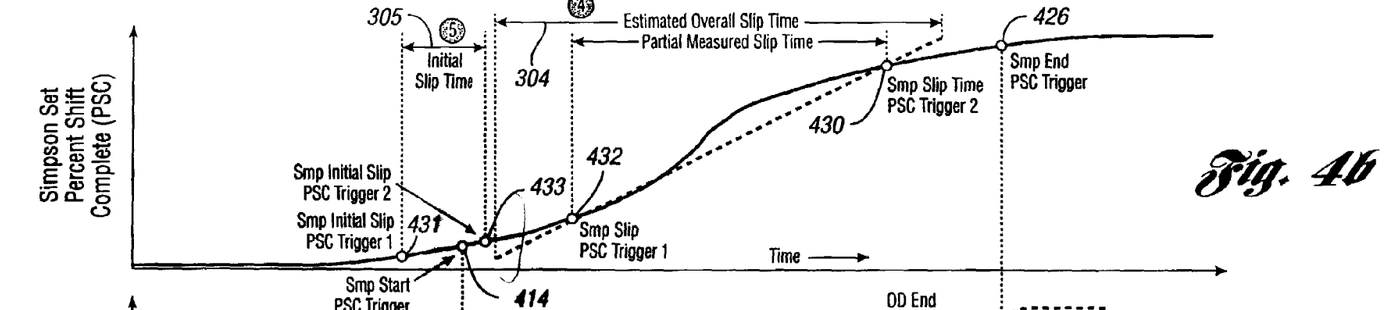
FIG. 4b is a time plot of the shift progression of the Simpson gearset, expressed as a percentage of shift complete, in accordance with the adaptive pressure control of the present invention.

The estimated overall slip time "4" for the Simpson gearset, which is the fourth of the measured conditions, is indicated in FIG. 4b at 304.

In order to estimate the overall slip time, a partial slip time is measured. That involves computing the time lapse between two calibrated trigger points 430 and 432 in FIG. 4b for the Simpson gearset ratio change progression. The estimated overall slip time is computed by extrapolating the partial measured slip time.

The initial slip time "5" for the Simpson gearset at the beginning of a swap-upshift is the fifth measured condition. This is indicated in FIG. 4b at 305. The initial slip time is measured by computing the time lapse between two calibrated Simpson gearset shift progression trigger points 431 and 433 in FIG. 4b.

The shift start synchronization, measured in time, between the two gearsets at the beginning of a swap-upshift is the sixth measured condition. It is indicated at "6" in the plot of FIG. 4c. This is the time measured from the shift progression trigger 414 in FIGS. 4b and 4f for the Simpson gearset to the overdrive shift progression trigger 416 in FIG. 4c. The desired synchronization is reached when the time lapse between the two trigger points is zero. The time lapse between trigger points 414 and 416 is also used to detect ratio flare during a swap-shift. If the overdrive gearset shift progression trigger point 416 is reached before the Simpson gearset shift progression trigger point 414, a ratio flare is detected.

Figure 4C:
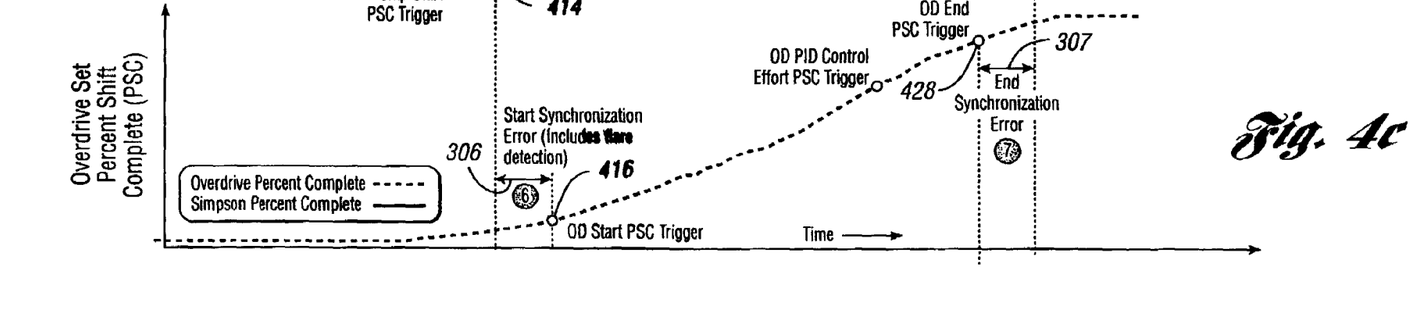
FIG. 4c is a time plot of the overdrive gearset shift progression, expressed as a percentage of shift complete, in accordance with the adaptive pressure control of the present invention.
Figure 4D:
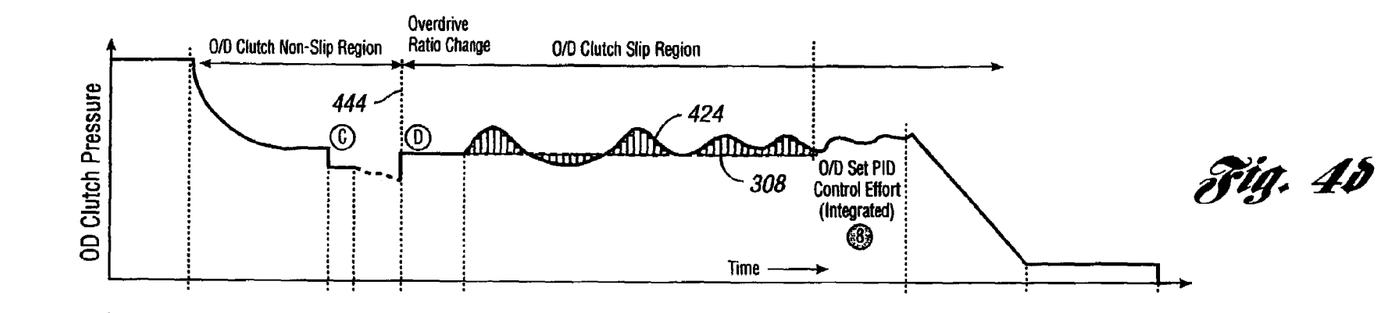
FIG. 4d is a time plot of the overdrive friction element pressure during a swap-upshift in accordance with the adaptive pressure control of the present invention.

The shift end synchronization error between the two gearsets, measured in time, is the seventh measured condition "7". This is indicated in FIG. 4c at 307. The time lapse between shift progression points 428 and 426 in FIGS. 4c and 4b, respectively, is the measurement of shift end synchronization.

The integrated cumulative closed-loop controller effort "8" for the overdrive gearset is the eighth measured condition. This is shown in FIG. 4d at 308. The closed-loop controller effort 308 is the area under the plot of the pressure for the overdrive friction element as the pressure deviates from the pressure established at parameter D.

Ratio overshoot error "9," measured in terms of shift progression, is the ninth measured condition. This is shown at 309 in FIG. 4f. If the overdrive gearset shift progression trigger point 428 in FIG. 4c is not reached before the Simpson gearset completes its shift, a ratio overshoot occurs. The amount of ratio overshoot is indicated by the remaining overdrive gearset shift progression.

Figure 4E:
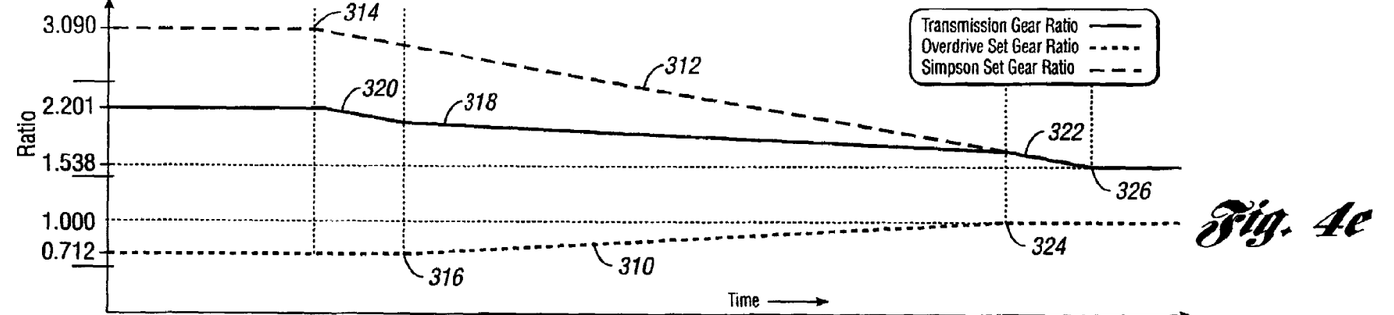
FIG. 4e is a time plot of the overall transmission ratio, the overdrive gearset ratio, and the Simpson gearset ratio during a swap-upshift in accordance with the adaptive pressure control of the present invention.
Figure 4F:
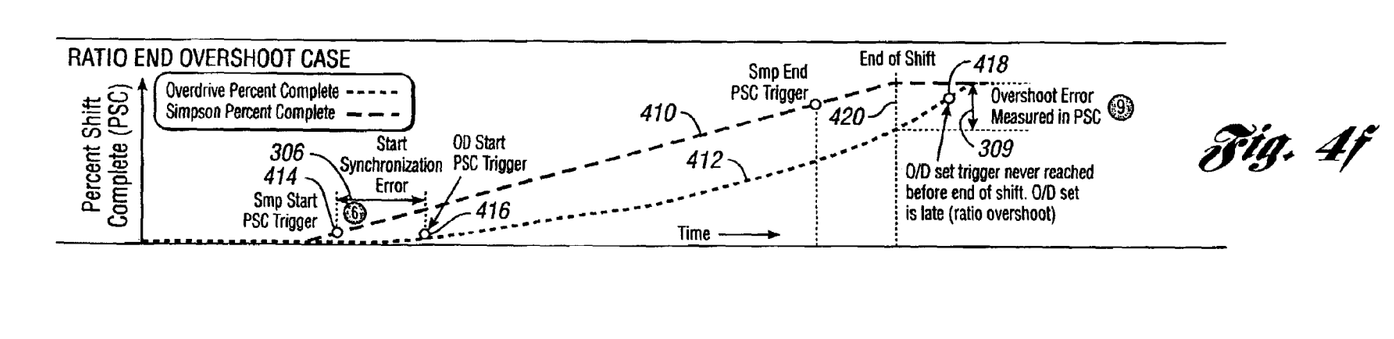
FIG. 4f is a time plot illustrating an example of a ratio overshoot at the end of a swap-upshift.

The overdrive gearset ratio is plotted in FIG. 4e for a swap-upshift, as shown at 310. The corresponding plot for the Simpson gearset is shown at 312. The beginning of the ratio change for the Simpson gearset begins at point 314, and the beginning of the ratio change for the overdrive gearset begins at point 316. Point 316 should occur at a time later than or at the same time as the beginning of the ratio change for the Simpson gearset at 314.

At a time between the points 314 and 316, the overall transmission ratio, shown at 318, varies as indicated at 320. The slope of the plot at 320 is parallel to the slope of the plot for the ratio change of the Simpson gearset at 312, since the ratio change for the overdrive gearset does not begin until a later time, as shown at 316. Likewise, at the end of the upshift, the overall transmission gear ratio coincides with the plot 312, as shown at 322, since the ratio change for the overdrive gearset is ended at time 324, which is earlier than the end of the ratio change for the Simpson gearset, as shown at 326 in FIG. 4e.

The operating conditions or metrics are compared to desired values, which are calibrated as a function of various operating conditions. This results in a computation of errors that are converted to potential pressure and boost time adjustments for both the Simpson gearset and the overdrive gearset friction elements. The computed adjustments are stored in the keep alive memory (KAM) 336 in FIG. 3a. The base pressure control values for the parameters A, B, C and D are computed at 345 in FIG. 3a.

Figure 3A:
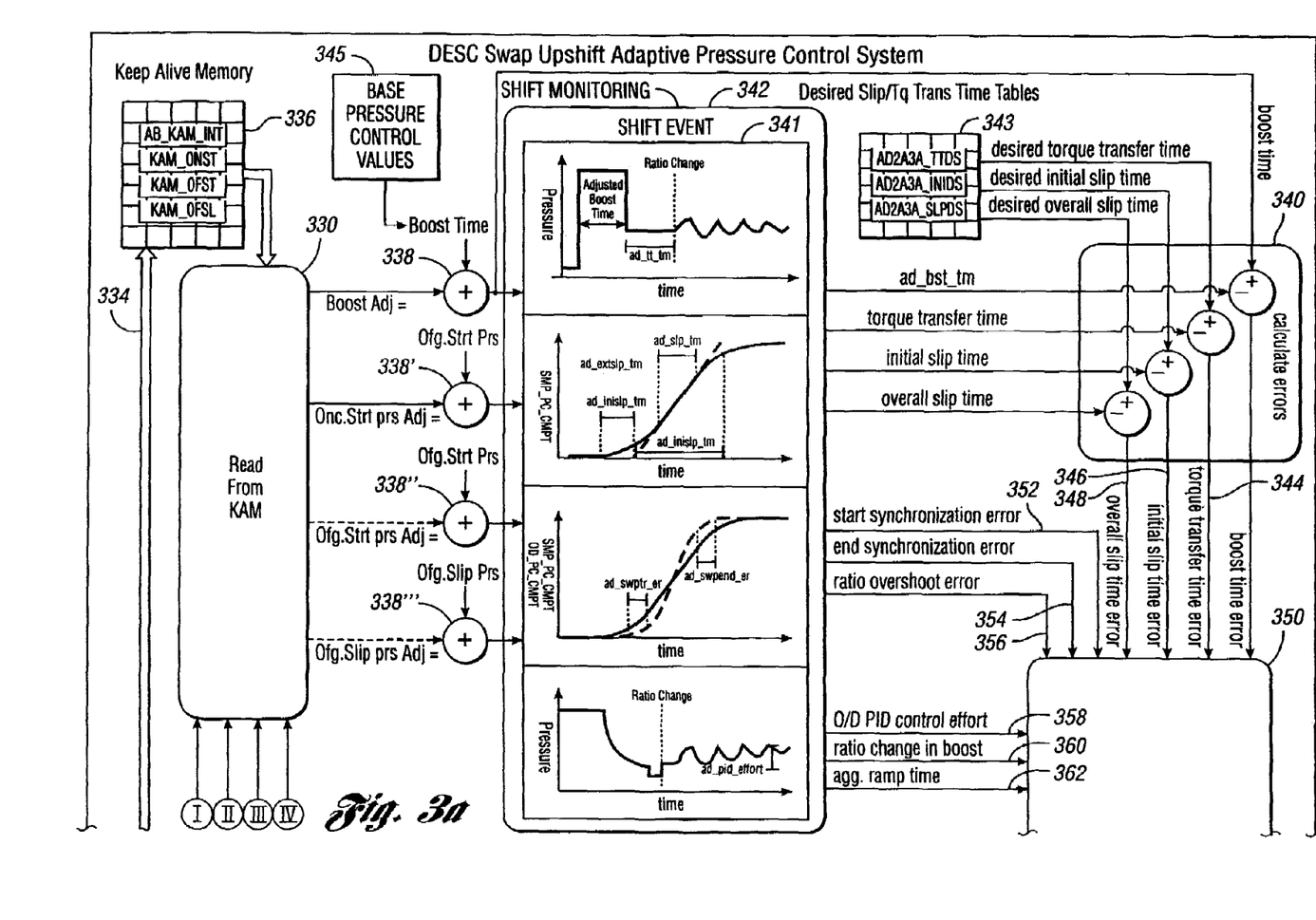
FIGS. 3a and 3b, taken together, are a schematic diagram of the architecture for the swap-shift adaptive pressure control system of the present invention.
Figure 3B:
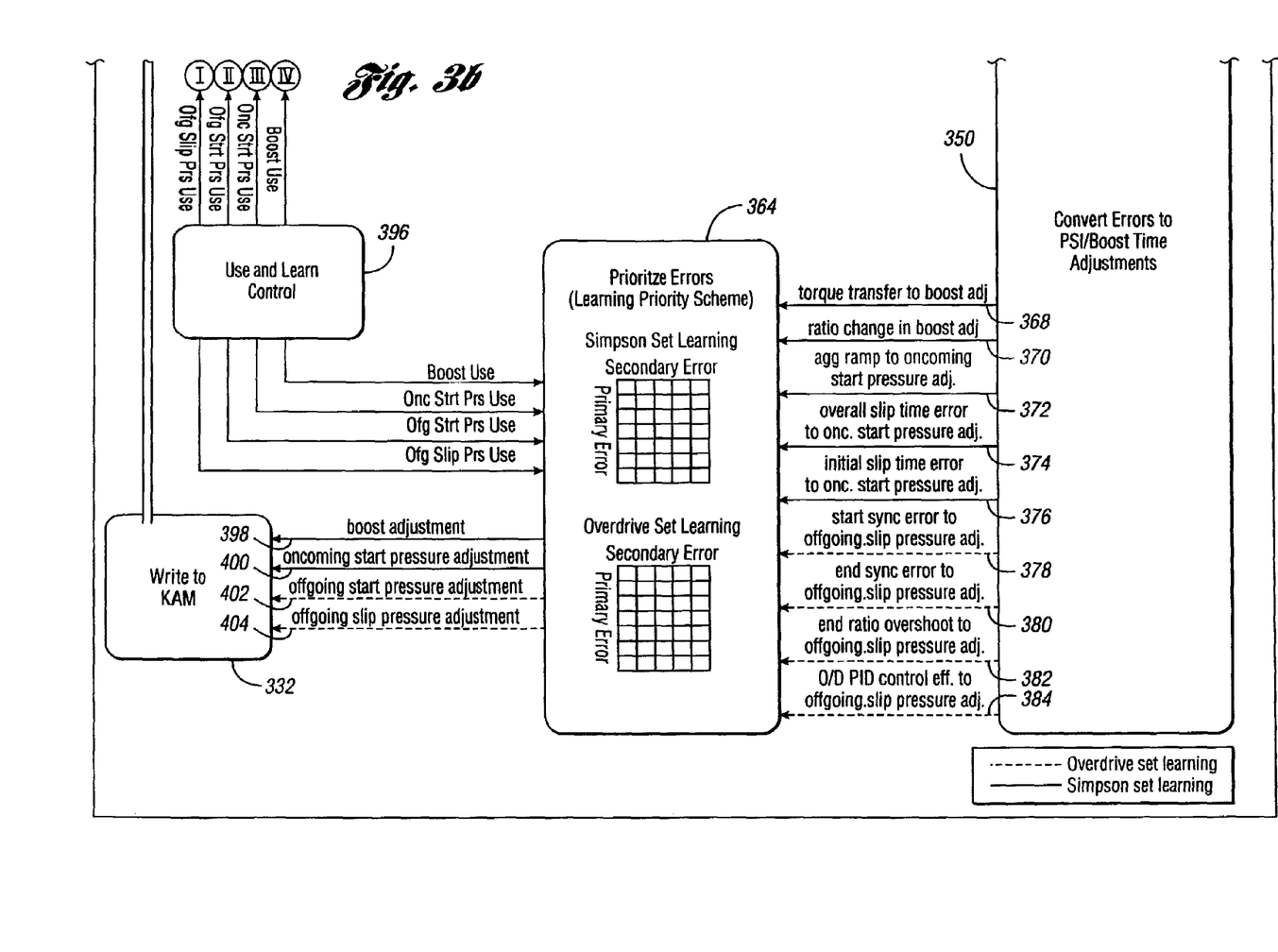

Pressure adjustment information is written to keep alive memory (KAM) 336 by block 332 in FIG. 3 busing bus 334. The adaptive adjustment information from 330, as read from KAM 336, is combined at 338, 338', 338" and 338''' with base pressure control values at 345 for boost time and offgoing friction element starting pressure to produce adjusted control values. Those adjusted control values, shown as shift event information at 341, are monitored by shift monitor 342. The monitored shift event information is transferred by shift monitor 342 to computation unit 340 in FIG. 3a.

An error in the boost time is computed at 340 in FIG. 3a by subtracting a measured boost time during the shift from the computed boost time. Other calibrated information, including information dealing with overall slip time, initial slip time and torque transfer time is stored in memory portion 343 in FIG. 3. By comparing the measured conditions to the calibrated values stored at 343, the errors are computed and converted to potential pressure and boost time adjustments for both the Simpson gearset and the overdrive gearset friction elements. The magnitude of the shift errors that are measured is reflected in the amount of the pressure and boost time adjustments.

The conversions of shift errors to corresponding pressure and boost time adjustments are calibratible so that learning can be speeded up or slowed down while the controller attempts to achieve the desired values during subsequent shifts.

The measured torque transfer time, which is the third condition previously described, is compared to the desired torque transfer time at 340 to produce a torque transfer time error at 344. The measured initial slip time, which is the fifth measured condition previously described, is compared to the desired initial slip time stored at 343 to produce an initial slip time error at 346. Further, the measured overall slip time, which is the fourth measured condition previously described, is compared at 340 to desired overall slip time stored at memory portion 343 to produce an overall slip time error at 348. The errors are converted to pressure and boost time adjustments at 350 in FIG. 3.

In addition to the errors computed at 340, there are six other calculated errors that are computed using monitored shift event information. These include the sixth measured condition, which is start synchronization error, as shown at 352; end synchronization error, which is the seventh measured condition, as shown at 354; ratio overshoot error, which is the ninth measured condition, as shown at 356; overdrive gearset closed-loop control effort, which is the eighth measured condition, as shown at 358; ratio change during the boost phase of the oncoming friction element, which is the first measured condition, as shown at 360; and aggressive ramp time, which is the second measured condition, as shown at 362.

Conversions of the errors received at 350 to pressure and boost time adjustments for the Simpson gearset are transmitted to the learning priority scheme computation unit 364, as shown at 368, 370, 372, 374 and 376 in FIG. 3b. Numeral 368 indicates the boost time adjustment due to torque transfer error, numeral 370 indicates boost time adjustment due to ratio change during boost, numeral 372 indicates oncoming friction element starting pressure adjustment for the Simpson gearset due to aggressive ramp time, numeral 374 indicates oncoming friction element starting pressure adjustment for the Simpson gearset due to overall slip time error, and numeral 376 indicates the oncoming friction element starting pressure adjustment for the Simpson gearset due to initial slip time error.

The pressure adjustments due to errors in the overdrive gearset measured conditions are shown at 378, 380, 382 and 384 in FIG. 3b. Numeral 378 indicates the offgoing starting pressure adjustment due to error in the start synchronization between the overdrive and Simpson gearsets; numeral 380 indicates the offgoing friction element slip pressure adjustment due to error in the end synchronization between the overdrive and Simpson gearsets; numeral 382 indicates a slip pressure adjustment for the overdrive gearset due to end ratio overshoot; and numeral 384 indicates a slip pressure adjustment for the offgoing friction element control effort, which is the eighth measured condition.

Figure 6:
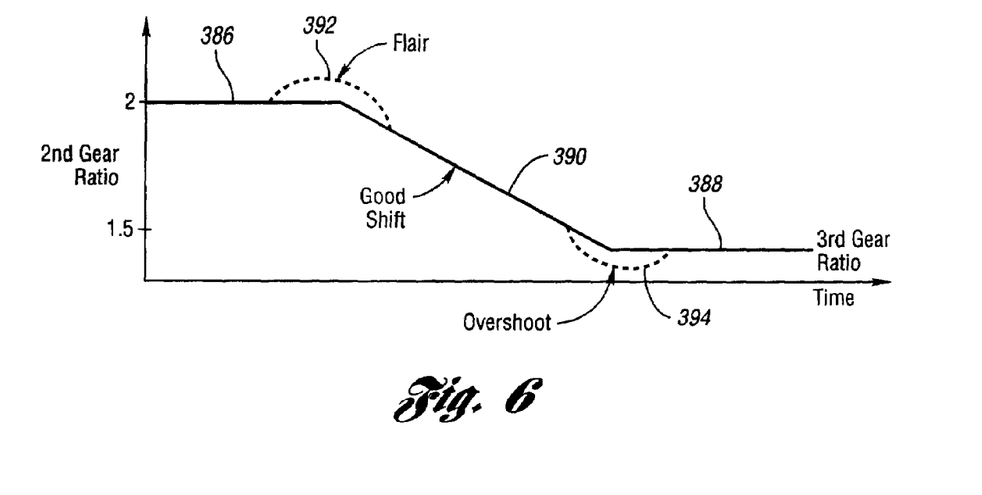
FIG. 6 is a time plot for a swap-shift showing schematically a ratio flare and a ratio overshoot.

FIG. 6 is a schematic illustration of when a flare occurs and when an overshoot occurs. For purposes of this illustration, a ratio change is plotted from the second ratio at 386 to a third ratio at 388. If a shift is an ideal shift, the ratio progression during the slip time of the friction elements is represented by the full line 390 in FIG. 6. If the overdrive gearset begins its ratio change (its friction element begins to slip) before the Simpson element begins its shift, a ratio flare will occur, as shown in FIG. 6 at 392. If the Simpson gearset ends its ratio change before the overdrive gearset finishes slipping, a ratio overshoot will occur, as indicated in FIG. 6 at 394. Either one of these conditions adversely affects the shift quality.

The measured conditions of the embodiment presently disclosed, as previously described, are nine in number. Either fewer or more conditions, however, could be measured if that is desired by the transmission calibrator. In any case, if multiple errors are detected, a priority schedule is followed at 364 in FIG. 3b. Learning is performed in the order of priority of the measured conditions 1 through 9. Further, if there are multiple errors, the priority scheme carried out at 364 can adapt more than one parameter.

The parameters A and B in FIG. 4a affect the point 303F at which the Simpson friction element begins to slip. The torque transfer time at 303 is measured. If that time is not correct, the pressure controller changes parameter A.

FIG. 3b illustrates at 396 that the calibrator can turn off or turn on the learning function of the four parameters A, B, C or D. Further, the calibration can configure whether adaptive adjustments are used for subsequent adjustments. If "use" is turned off, only the base pressure control value will be commanded. This is indicated in FIG. 3b at 396. These on or off commands are distributed, as shown in FIGS. 3a and 3b, to the read from KAM sub-system 330, and the prioritizing system 364.

The output of the prioritizing system 364 is a boost time adjustment for the Simpson gearset at 398, an oncoming start pressure adjustment for the Simpson gearset at 400, an offgoing start pressure adjustment for the overdrive gearset at 402, and an offgoing slip pressure adjustment at 404. Those values are transferred, as seen in FIG. 3a, to the keep alive memory 336, and are read from the KAM memory 330 for use in the next shift.

Figure 5A:
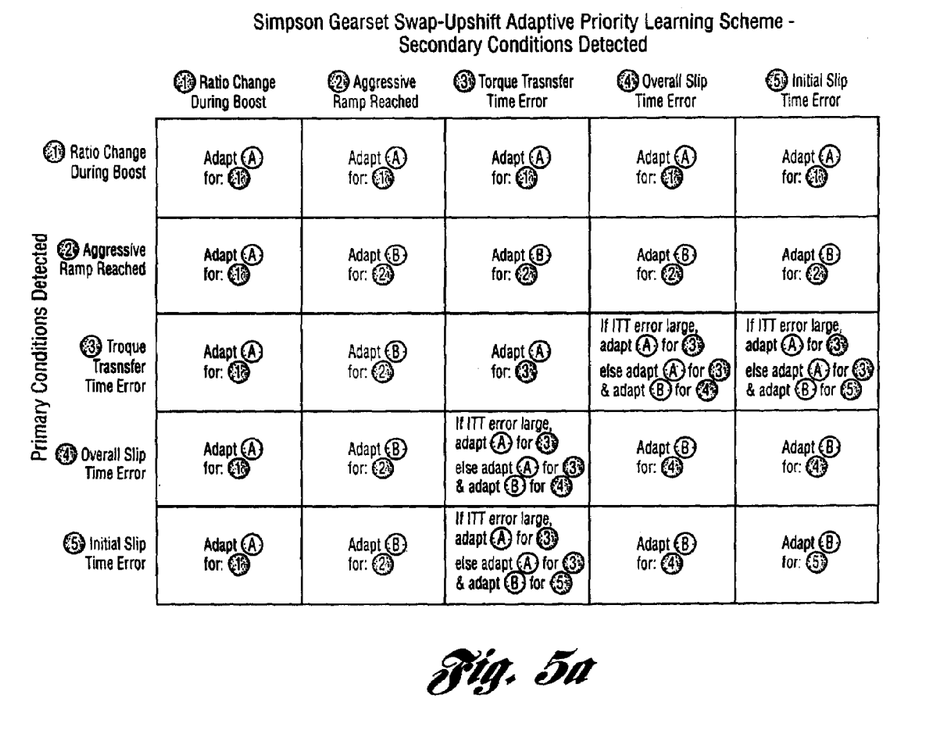
FIG. 5a is a swap-upshift adaptive priority learning scheme for the Simpson gearset.
Figure 5B:
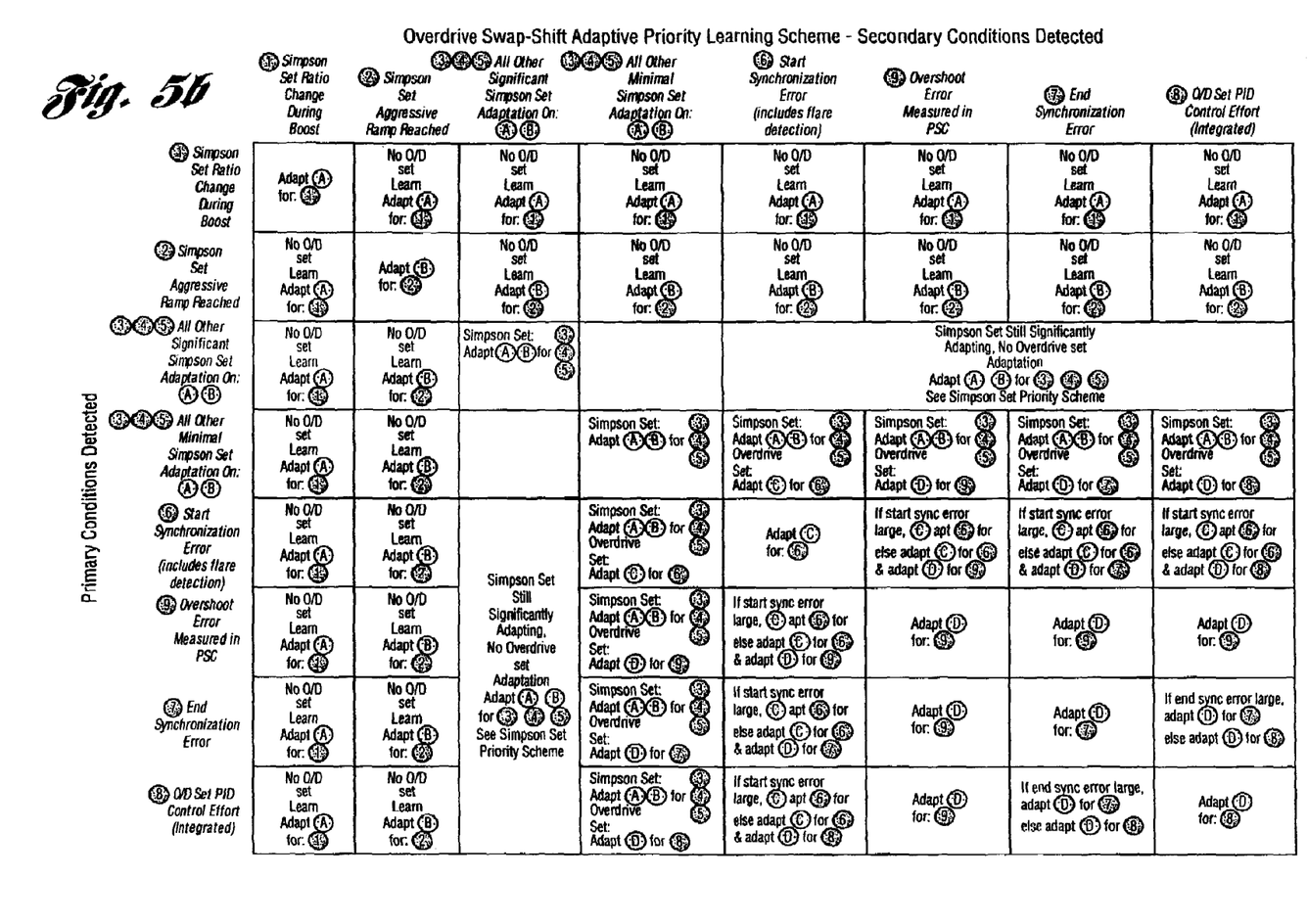
FIG. 5b is a swap-upshift overdrive gearset adaptive priority learning scheme for the overdrive gearset, illustrating priority for compensation of operating errors when multiple errors are present during any given swap-upshift.

FIG. 5a is a table that demonstrates the swap-upshift adaptive priority learning scheme for the Simpson gearset. FIG. 5b is a table indicating the swap-shift adaptive priority learning scheme for the overdrive gearset. Shown in FIGS. 5a and 5b are the four basic parameters, A, B, C and D. Also shown in FIGS. 5a and 5b are the various measured conditions, numbered "1" through "9," previously discussed. In FIG. 5a, for example, measured condition "3" is a measure of the torque phase of the friction element for the Simpson gearset during a shift. Measured condition "4" indicates the inertia phase of the friction element for the Simpson gearset during a ratio shift.

For purposes of this description, let it be assumed that the third measured condition "3" indicates a torque transfer time error. If that is the only error, FIG. 5a indicates that the error can be adapted using parameter A. If it is assumed that the Simpson gearset measured condition "2" indicates an aggressive ramp, FIG. 5a indicates that condition "2" can be corrected by adapting with parameter B. If overall slip time error is present, condition "4" can be corrected using parameter B. If initial slip time error is present, condition "5" can be corrected using parameter B.

If multiple errors are detected, it is necessary for the controller to prioritize. For example, if errors "3," "4" and "5" are detected simultaneously and error "3" is large, an error in condition "3" would be corrected using parameter A. The errors in conditions "4" and "5" then would not be corrected until subsequent shifts occur after the error in condition "3" is corrected.

The priority scheme of FIGS. 5a and 5b furthermore can distinguish between errors that are large and errors that are small. For example, if a large synchronization error "6" and a ratio overshoot 9 are detected simultaneously, FIG. 5b indicates that start synchronization error "6" will be corrected using parameter C. Otherwise, if start synchronization error is small, both errors "6" and "9" will be corrected using parameters C and D, respectively.

If learning is required, simultaneous learning can take place for both gearsets when the Simpson gearset is not significantly learning.

Although an embodiment of the invention has been disclosed, it will be apparent to persons skilled in the art that modifications may be made without departing from the scope of the invention. All such modifications and equivalents thereof are intended to be defined by the following claims.

What is claimed:

1. An adaptive pressure control method for a swap-shift transmission having first and second gearsets arranged in series and defining multiple overall gear ratios as power is transmitted from an engine-driven power input shaft to vehicle traction wheels, each gearset having a pressure-actuated friction element to establish selectively each of two gearset ratios, the method comprising the steps of:

simultaneously controlling friction element pressure for the first and second gearsets during a swap-shift whereby friction element pressure for the second gearset is increased as friction element pressure for the first gearset is decreased during progression of the swap-shift;

applying a calibrated boost pressure on the friction element for the second gearset before a start of torque transfer between the friction elements;

reducing boost pressure to a starting pressure for the friction element for the second gearset;

detecting an error in a starting pressure during a current shift, whereby the pressure on the friction element for the second gearset is too low to begin a shift;

ramping the pressure on the friction element for the second gearset to a value needed to begin a shift;

detecting the time of the pressure ramping during a current shift; and converting ramping time to a pressure adjustment for the friction element of the second gearset, thereby changing pressure ramping during a subsequent shift.

2. The control method set forth in claim 1 wherein the step of simultaneously controlling friction element pressure includes the steps of:

detecting torque transfer time from the end of the boost time to a start of ratio change for the second gearset following reduction of boost pressure;

detecting an error in torque transfer time relative to a calibrated value during a current shift; and converting the error in torque transfer time to a pressure adjustment for the friction element for the second gearset, thereby reducing the error during a subsequent shift.

3. The control method set forth in claim 1 wherein the step of simultaneously controlling friction element pressure includes the steps of:

detecting overall slip time for the friction element for the second gearset as the friction element for the second gearset gains capacity and the friction element for the first gearset loses capacity;

detecting an error in the overall slip time for the friction element for the second gearset relative to a calibrated value during a current shift; and converting the error to a pressure adjustment for the starting pressure for the second gearset during a subsequent shift whereby the error is reduced.

4. The control method set forth in claim 1 wherein the step of simultaneously controlling friction element pressure includes the steps of:

detecting an initial slip time for the friction element for the second gearset as the friction element for the second gearset gains capacity and the friction element for the first gearset loses capacity, the initial slip time being measured from the time the friction element for the second gearset begins to slip following torque transfer to a calibrated initial slip time target value;

detecting an error in the initial slip time for the friction element for the second gearset during a current shift; and converting the error in initial slip time for the friction element for the second gearset to a pressure adjustment for the friction element starting pressure for the second gearset during a subsequent shift whereby the error is reduced.

5. The control method set forth in claim 1 wherein the step of simultaneously controlling friction element pressure includes the steps of:

calibrating a shift progression trigger value for the friction element of the second gearset and a shift progression trigger value for the friction element for the first gearset;

monitoring the time at which each gearset reaches a trigger value;

detecting an error in the start synchronization during a current shift by computing the difference in the monitored time values; and converting the error to a starting pressure adjustment for the friction element for the first gearset during a subsequent shift whereby the error is reduced.

6. The control method set forth in claim 1, wherein the step of simultaneously controlling friction element pressure includes the steps of:

reducing pressure on the friction element of the first gearset as an upshift is commanded to a starting pressure value before the friction element for the first gearset begins to slip; and adjusting pressure on the friction element of the first gearset to a starting pressure as the friction element for the first gearset begins to slip.

7. The control method set forth in claim 1 wherein the step of simultaneously controlling friction element pressure includes the steps of:
  reducing pressure on the friction element of the first gearset as an upshift is commanded to a starting pressure value before the friction element for the first gearset begins to slip;
  controlling pressure in the friction element of the first gearset using closed-loop pressure control during a current shift;
  computing closed-loop control effort during slip time of the first gearset; and
  converting computed closed-loop control effort to an adjusted pressure in the friction element of the first gearset during a subsequent shift.

8. The control method set forth in claim 1 wherein the step of simultaneously controlling friction element pressure includes the steps of:
  reducing pressure on the friction element of the first gearset as an upshift is commanded to a starting pressure value before the friction element for the first gearset begins to slip;
  adjusting pressure on the friction element of the first gearset to a starting pressure;
  detecting flare as the friction element of the second gearset begins to gain capacity and the friction element of the first gearset begins to lose capacity during a current shift; and
  adjusting starting pressure for the first friction element to reduce flare during a subsequent shift.

9. The control method set forth in claim 1 wherein the step of simultaneously controlling friction element pressure includes the steps of:
  calibrating shift progression trigger values for the friction element of the first gearset;
  calibrating shift progression trigger values for the friction element of the second gearset;
  monitoring the time at which each gearset reaches its trigger values;
  detecting an end synchronization error during a current overall shift by computing the difference in monitored times for the first and second gearsets at the end of an overall shift; and
  converting the error to a slip pressure adjustment for the first friction element during a ratio change for the first gearset in a subsequent overall shift.

10. The control method set forth in claim 1 wherein the step of simultaneously controlling friction element pressure includes the steps of:
  calibrating shift progression trigger values for the friction element of the first gearset;
  calibrating shift progression trigger values for the friction element of the second gearset;
  monitoring the time at which each gearset reaches its trigger values;
  detecting an overshoot error by comparing the monitored times for the first and second gearsets at the end of an overall shift during a current shift; and
  converting the error to a slip pressure adjustment for the first friction element during a ratio change for the first gearset in a subsequent overall shift.

* * * * *